July 28, 1970  W. T. GRUBB  3,522,096
LONG LIFE FUEL CELL AND ELECTRODE THEREFOR
Filed Dec. 30, 1966
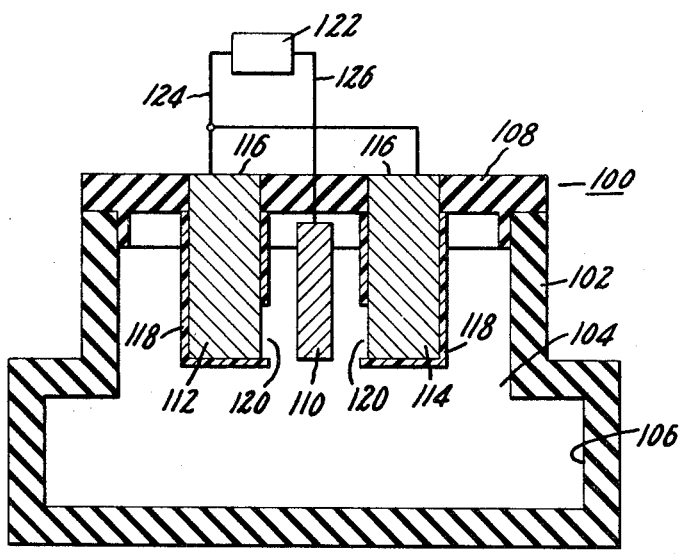
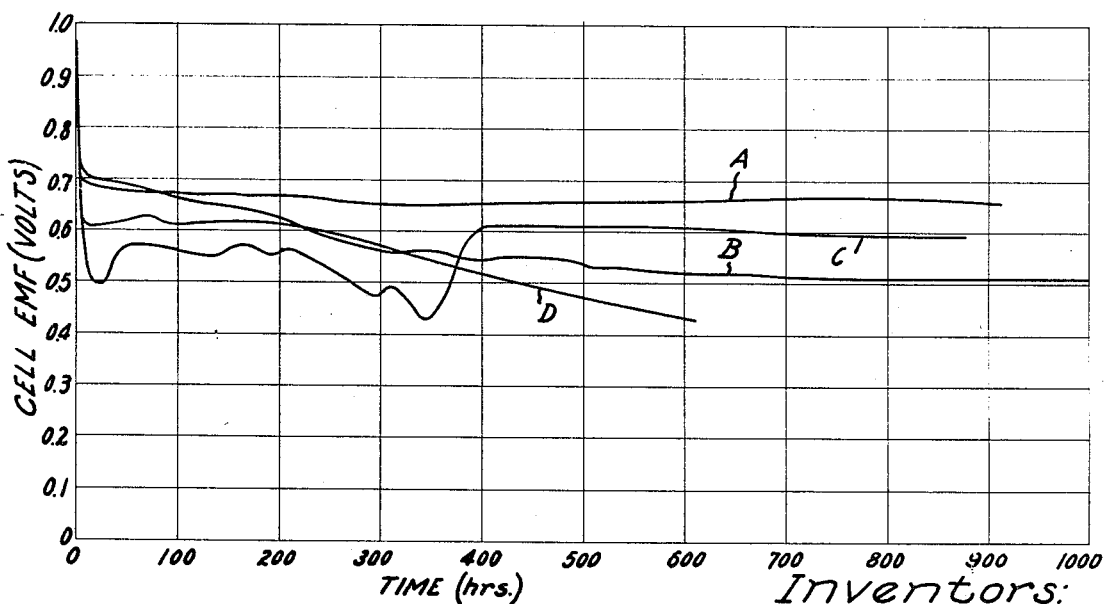
Inventors:
Willard T. Grubb,
Carl E. Cliche,
by Carl O. Thomas
Their Attorney.

United States Patent Office 3,522,096
Patented July 28, 1970

3,522,096
LONG LIFE FUEL CELL AND ELECTRODE THEREFOR
Willard T. Grubb and Carl E. Cliche, Schenectady, N.Y., assignors to General Electric Company, a corporation of New York
Filed Dec. 30, 1966, Ser. No. 606,231
Int. Cl. H01m 27/00
U.S. Cl. 136—86           8 Claims

ABSTRACT OF THE DISCLOSURE

A cathode in the shape of a bar is used in combination with an aqueous alkaline electrolyte containing dissolved alcohol. The bar configuration minimizes alcohol evaporation and allows high efficiency of alcohol utilization even over prolonged periods. Bars that are both masked and wet-proofed perform better than bars that lack masking, wet-proofing, or both. The anode and cathode may be narrowly spaced and a storage plenum for electrolyte and alcohol provided therebeneath.

---

Our invention is considered to be classifiable with primary batteries having gas electrodes.

Prior to our invention it has been known in the art that a fuel cell may be constructed utilizing an aqueous alkaline electrolyte having alcohol dissolved therein. An anode is maintained in contact with the electrolyte that is capable of electrocatalytically oxidizing alcohol. A porous cathode is utilized as a barrier between the electrolyte and an oxidant, usually air. The cathode is provided with an electrocatalyst that is capable of electrochemically reducing the oxidant but which is catalytically passive toward alcohol.

In one form our invention is directed to a fuel cell unit comprised of a closed housing means having an aqueous alkaline electrolyte containing dissolved alcohol confined therein. Anode means for the electrochemical oxidation of alcohol lie within the housing means in contact with the electrolyte. A porous cathode catalytically passive toward alcohol extends from the exterior of the housing means into contact with the electrolyte and in spaced relation with the anode means. As our improvement the cathode is provided with the configuration of a bar having one end exposed to oxidant exterior of the housing means. Means are provided to mask the bar from contact with the electrolyte over an areal extent adjacent the exposed end while a portion of the bar remote from the exposed end forms an interface with the electrolyte.

In another aspect our invention is directed to an electrode including a bar formed of a porous electronically conductive mass. A mask covers the exterior surface of the bar between a first areal portion adjacent one end at which the bar may be exposed to a reactive gas and a second areal portion adjacent the remaining end at which the bar may be exposed to an electrolyte. At least the portion of the conductive mass adjacent the second areal portion is electrocatalytically active.

Our invention may be better understood by reference to the following detailed description considered in conjunction with the drawings, in which.

FIG. 1 is a vertical section of a fuel cell unit and

FIG. 2 is a plot of potential versus time.

A preferred embodiment of our invention is illustrated in FIG. 1. The fuel cell unit 100 is provided with a lower housing portion 102 that defines a combined electrolyte and dissolved fuel storage chamber 104. The chamber is enlarged in its lower part to form a storage plenum 106 for electrolyte and dissolved fuel that exceeds the storage capacity of the upper portion of the chamber.

An upper housing portion 108 is sealingly and, preferably, removably related to the lower housing portion. Centrally carried by the upper housing portion is an anode means 110. Narrowly spaced from the anode means on either side are porous cathodes 112 and 114. The upper end of each cathode is exposed to the atmosphere exterior of the housing as indicated at 116. The cathodes are each formed in the shape of a bar extending downwardly into the fuel and electrolyte chamber defined by the housing. A mask 118 overlies each porous cathode except for an exposed area 120 facing the anode means.

The porous cathodes are connected in parallel to an electrical load 122 through an electrical lead 124, schematically shown. Electrical lead 126 connects the load to the anode means.

In the preferred form of our invention a mixture of an aqueous alkaline electrolyte and alcohol are confined within the fuel and electrolyte chamber 104. As is well understood in the art, the electrolyte may be aqueous alkali solution of any desired concentration. While the alkali metal hydroxides are the most commonly employed and of the lowest cost, it is appreciated that other soluble hydroxides, such as ammonium and phosphonium hydroxides may be employed. As used herein the term "alcohol" includes methanol, ethanol, n-propanol, and isopropanol—that is, any alcohol having from 1 to 3 carbon atoms. Methanol is a preferred alcohol on the basis of cost and reactivity. Since the alcohols are miscible with water in all proportions, any desired quantity may be utilized. It is preferred, however, that the relation of hydroxyl ions to alcohol be maintained in the molar ratio of at least 2 to 1. This insures that all the alcohol will be consumed during extended operation of the unit.

The provision of a storage plenum 106 beneath the cathodes and anode means allows the quantity of alcohol capacity of the fuel cell unit to be increased at will without in any way penalizing performance of the unit. In previously constructed alcohol-air fuel cells having alcohol dissolved in the electrolyte, it has been the practice to store the alcohol-electrolyte mixture principally between the electrodes. Thus, as the storage capacity was increased the spacing between the electrodes was increased. This in turn led to a higher internal resistance for the fuel cells. In our fuel cell unit the electrodes need be only narrowly spaced, and the spacing is entirely independent of the alcohol storage capacity.

Another unexpected advantage associated with our fuel cell unit is that by storing the alcohol-electrolyte mixture principally below the level of the electrodes, the efficiency of the unit is improved. This is because during operation carbonates will be formed within the housing as a reaction product and the alcohol will become more dilute. It is our recognition that, since the carbonate in solution is of greater density than the methanol in solution, the alcohol concentration adjacent the electrodes can be maximized by the vertical storage arrangement. Carbonate formed during operation of the unit tends to collect in the storage plenum while alcohol concentrations are higher in the upper portion of the chamber adjacent the electrodes.

The anode means is schematically illustrated in the drawing. It may be of any conventional construction or configuration. Anodes capable of efficiently oxidizing alcohol usually include nickel or platinum metals as electrocatalysts. Alloys of platinum and ruthenium are generally considered most efficient. The electrocatalyst may be employed as a black coating on a substrate, suitably bonded into a porous mass, supported on a porous substrate of carbon, etc. Since the alcohol is dissolved in the electrolyte it is generally unnecessary that the anode include any provision for wet-proofing.

The porous cathode is formed of a porous electronically conductive mass which, at least at the point where the conductive mass forms an interface with the electrolyte, includes an electrocatalytically active material. The electrocatalyst is catalytically active toward the reduction of oxidant but is catalytically passive toward the oxidation of alcohol. A preferred suitable material meeting all of the above criteria is a porous carbon mass. This material is recognized to selectively catalyze the reduction of oxygen while remaining passive toward alcohol. Other catalysts are, of course, known which are selective to the reduction of oxygen. Spinels are such materials. Although the cathode may be constructed without the addition of wet-proofing materials, in the preferred form wet-proofing material is distributed throughout the conductive mass. Alternately, a thin, porous coating of wet-proofing may be employed limited to the area at which the conductive mass contacts the electrolyte. The choice of porous conductive materials, electrocatalysts, and wet-proofing agents is generally well understood in the art and requires no further description. As an illustration, attention is directed to French Pat. 1,371,815, filed May 24, 1963 and issued Aug. 3, 1964.

It is our inventive contribution to form the cathode in the configuration of a bar and to cover the exterior surface mediate the points of oxidant entry and electrolyte contact with a mask. The mask may be formed of any material which is impervious to oxidant as well as fuel and electrolyte. The function of the mask is to avoid contact of oxidant with fuel and electrolyte on the surface of the conductive mass, except at the intended electrolyte interface. Specific examples of masking materials include impervious metal coatings as well as coatings of alkali and methanol impervious non-metals, such as glass, ceramics, waxes, rubbers, and resins. The mask is preferably applied in the form of an adhesive coating. Wax has been found to be an easily applied, low cost masking material of suitable stability. It is an unexpected discovery associated with our invention that cathodes which are both masked and wet-proofed perform better than corresponding electrodes lacking either masking, wet-proofing, or both. This is surprising since masking was initially undertaken merely to slow alcohol evaporation from a cell, as will be more fully explained below.

The term "bar" is employed herein in the dictionary sense as indicating an object having a length which exceeds both the width and thickness. A bar is provided with two ends separated by the length—that is, the longest dimension. The term "bar," of course, excludes a tube or any other holow configuration, since the term is restricted to solid bodies. It is recognized that a bar need not be limited to any specific cross-sectional configuration. Bars that are in cross-section circular, elliptical, polygonal, or irregular are still bars and within the purview of the term as herein used. Also included are narrow plates.

It is our belief that our concept of using a cathode in the configuration of a bar and of masking the bar so that oxidant must travel longitudinally therethrough is unique in the art. Heretofore it has been generally considered that forcing a reactant to travel any extended distance within an electrode in order to reach the electrolyte interface is undesirable. Accordingly, electrodes have been formed comparatively thin in the direction of reactant penetration. In other words, electrodes have been almost universally constructed in the form of thin plates or thin walled tubes. But regardless of the configuration, the reactant has always been introduced through the thinnest dimension—i.e., the thickness of the electrode.

The purpose of forming electrodes in this manner has been to maximize the current carrying capacity of the electrode in order to obtain the highest practical operating potential. By exposing a large cathore surface area to a reactant and maintaining the electrolyte interface in close proximity by employing a minimal thickness, the maximum rate at which reactant can be consumed is maintained well in excess of the anticipated operating consumption rate. Stated in terms of current, a large electrode over-capacity allows a large limiting current. By maintaining the limiting current high as compared to the actual operating current, a high operating potential is obtained. This is because the potential of a fuel cell is at its highest level when no current is being drawn and declines progressively to zero as the limiting current is approached.

It is anticipated that alcohol fuel cells of the type shown in the drawing will find primary applicability to situations requiring operation on ambient air to meet low electrical power demands over extended time periods. Where a fuel cell having alcohol dissolved in the electrolyte is to be operated unattended over an extended period of time, say one to five years, for example, the rate at which alcohol can evaporate from the cell becomes a matter of significant importance. Where a very large excess rate of air diffusion to the cathode is provided, it is possible for substantial quantities of alcohol to be evaporated and the period of operation between refuelings to be significantly reduced.

We have discovered quite unexpectedly that it is possible to limit the cathode over-capacity by increasing the oxygen diffusion path while avoiding significant performance penalties. This is based in part upon our recognition that the rate at which oxygen can diffuse through a cathode to the electrolyte interface is approximately sixty times the rate at which methanol, for example, can diffuse from the electrolyte interface to air under ambient conditions. Accordingly, it is possible to form a cathode of a bar configuration that will greatly reduce the rate of alcohol diffusion from the electrolyte while still allowing air to diffuse to the electrolyte interface in appreciable quantities. In the situation in which the electrical load draws only a few milliamperes of current, it is still possible for air to diffuse through the length of the bar to the electrolyte interface at a rate to support a limiting current many times larger than the actual operating current. Because the actual current being drawn is low, the operating potential remains high, since variations in limiting current exhibit less effect on actual potential at lower operating currents. This is, of course, quite apparent when the limiting case is considered. At zero current the potential of an alcohol-air cell is completely independent of its current carrying capacity.

The fuel cell unit is placed in operation by removing the upper housing portion 108 from the lower housing portion 102 and filling the fuel and electrolyte chamber 104 with a mixture of alcohol and an aqueous alkali solution. The upper housing portion is then sealingly refitted so that a closed housing is formed.

A high resistance electrical load 122 is then connected to the porous cathodes by electrical lead 124 and to the anode means by electrical lead 126. Alcohol is slowly oxidized from within the closed housing at the anode means to supply electrons to the electrical lead 126 while oxygen lying within the pores of the cathodes adjacent the exposed areas 120 is slowly reduced withdrawing electrons from electrical lead 124 in the process.

To replenish the oxygen withdrawn from the cathode at the cathode-electrolyte interface air slowly diffuses through the length of the porous, electronically conductive bar forming each cathode. To prevent oxygen from diffusing laterally through the porous conductive mass and contacting the electrolyte toward the upper end of the bars, masks 118 are provided, which limit the interface of the electrolyte and porous conductive mass to limited areas facing the anode means. Thus, alcohol diffusing from the restricted interface to the upper end of the porous cathodes is provided with a relatively long diffusion path. The rate of alcohol diffusion is thus significantly curtailed. By using two cathodes instead of one, full advantage is taken of the electrocatalyst on both sides of the anode means. Since platinum metals may be used in the anode, this may represent a significant cost reduction.

While we have described our invention with reference to a preferred embodiment, it is appreciated that the invention is not limited to this embodiment. With regard to the alcohol-air fuel cell unit shown in the drawing, it is obvious that only one cathode is required. Also, it is not essential that the housing include a storage plenum beneath the electrodes. While the cathodes and anode means are illustrated in a side by side relationship, it is appreciated that the cathodes could be masked over the entire surface area, except the lower ends and the anode mounted in spaced relation with the lower ends. The mask could, if desired, be formed as a part of the upper housing portion. Also, it is not essential that the bars be formed straight as shown. The bars may be curved. For example, the bars may curve inwardly toward the anode means in order to minimize the electrolyte gap therebetween. In the preferred form the porous bar portions of the cathodes are each wet-proofed so that the electrolyte interface is maintained at the areal portion 120. In an alternative arrangement the cathodes need not be wet-proofed. In this case the electrolyte-air interface can be maintained at any desired level within the porous, electronically conductive mass merely by adjusting the relative pressure of the atmosphere exterior of the housing and the pressure on the electrolyte within the housing. For example, the entire fuel cell unit could be mounted within an oxygen chamber of controlled pressure. It is appreciated that it is not essential that the housing be formed in two parts as shown. Any closed housing construction that permits fluid to be introduced into and removed therefrom may be employed. The two part housing construction is considered particularly advantageous, however, in that it permits spent reactants to be easily and quickly removed from the unit. It is further appreciated that the advantages of employing an alcohol storage plenum beneath the electrodes is not limited to the fuel cell unit shown. Dissolved alcohol cells employing conventional electrodes could be improved as well by the incorporation of this feature. Finally, while the bar configuration cathode illustrated and described is considered to offer significant advantages in combination with a dissolved alcohol cell, such an electrode would be operative as a cathode in a variety of fuel cell constructions.

To illustrate a specific application of our invention, a fuel cell unit was constructed of a geometry approximating that of the size D Leclanche dry cells widely commercially sold to power devices such as flashlights, etc. The fuel cell unit was cylindrical having an upper housing portion sealingly and removably related to a lower housing portion similarly as the housing illustrated in FIG. 1. An anode and a single cathode were mounted by the upper housing portion similarily as in FIG. 1. The housing was formed of a fluorinated hydrocarbon polymer synthetic resin sold under the trademark "Kel-F." The fuel cell unit weighed 3.9 oz. as compared to 3.7 oz. for a size D Leclanche cell. The unit displaced a volume of 3.4 cubic inches as compared to the Leclanche cell displacement of 3.3 cubic inches.

The anode for the fuel cell unit included a gold plated nickel foam current collector one-sixteenth inch thick having uniformly spread throughout the pores thereof 0.18 gram of an electrocatalytically active powder comprised of 29.4 mg. of a platinum-ruthenium alloy containing 7.7 percent by weight ruthenium supported on boron carbide. The surface dimensions of the electrocatalytically active area of the anode were one-half inch by one inch.

The cathode was formed of a bar of commercial grade 48 percent porous carbon having a width and thickness of one-half inch by one-half inch forming an area of one-quarter inch square. One end of the cathode was mounted exposed to the exterior of the housing. The bar was one and three-eighths inches in length and uniformly impregnated with polyethylene, which formed 3.54 percent by weight of the bar. The bar was coated over its exterior surface within the housing with ceresin wax, except for a rectangular area one-half inch by one inch on one side which was uniformly spaced three-sixteenths inch from the anode.

The cell was filled with 47 ml. of a mixture of 6 molar methanol and 13 molar potassium hydroxide. As initially assembled the cell exhibited an internal resistance of 1.08 ohms. The cell was operated between open circuit and limiting current indicating the following polarization characteristics, measured after 24 hours equilibrium at each load.

TABLE 1

| Potential (volts): | Current (milliamperes) |
|---|---|
| 0.95 | 0 |
| 0.66 | 1.3 |
| 0.55 | 3.5 |
| 0.49 | 5.1 |
| 0.44 | 7.6 |
| 0.31 | 9.2 |
| 0.14 | 11.4 |
| 0 | 12.0 |

After operation for 700 hours at a constant current of approximately one milliampere, the potential was noted to be 0.635 volt at 1.24 ma.

The advantages of a cell constructed as described utilizing methanol as a fuel with 80 percent efficiency are best appreciated by reference to Table II.

TABLE II

| | Methanol Cell | Leclanche D Cell |
|---|---|---|
| Weight | 3.9 oz. | 3.7 oz. |
| Volume Displaced | 3.4 in.³ | 3.3 in.³ |
| Energy Output: | | |
| At 1 ma | 24 watt-hours (1 ma. at 0.6 volt for 40,000 hours). | 10 watt-hours (1 ma. at 1.3 volts for 8,000 hours). |
| At 4 ma | 20 watt-hours (4 ma. at 0.5 volt for 10,000 hours). | 10 watt-hours (4 ma. at 1.2 volts for 2,000 hours). |
| Energy Density: | | |
| At 1 ma | 99 watt-hours/lb | 43 watt-hours/lb. |
| At 4 ma | 82 watt-hours/lb | 43 watt-hours/lb. |

From the above it is apparent that fuel cell units constructed according to our invention offer a much higher energy output, a longer useful operating life, and a higher energy density than a Leclanche cell of comparable weight and volume displacement.

To illustrate the effect of masking and wet-proofing on cell performance, cells similar to that described above but differing in housing construction in that the housing was formed of a beaker having a lid formed of a plate of poly-(methyl methacrylate) sealed thereto with wax were constructed. In one of the cells a cathode was used as described above. That is, the cathode was both masked and wet-proofed. The proportion of wet-proofing was 4.7 percent by weight polyethylene. The performance of this cell when a 510 ohm load was connected across the terminals is shown as curve A in FIG. 2. Another cell was constructed with approximately 4.3 percent wet-proofing at the cathode but lacking masking. To test this cell a 710 ohm load was connected between the electrodes. While it would have been thought that the higher resistance load would result in a higher potential for the cell, since the current drawn was lower, in fact a lower potential was observed as indicated by curve B in FIG. 2. A third cell was constructed using a cathode which was masked, but which lacked any wet-proofing for the carbon bar. With a 510 ohm resistance connected between the electrodes the performance was considerably worse than the previously tested electrodes, as indicated by curve C in FIG. 2. A fourth cell employing a cathode lacking both masking and wet-proofing was discharged through a 510 ohm resistance load for purposes of further comparison. The performance of this cell is shown in FIG. 2 as curve D. This cell performed worse than any

What we claim and desire to secure by Letters Patent of the United States is:

1. In a fuel cell unit comprised of
a closed housing means,
an aqueous alkaline electrolyte containing dissolved alcohol having one to three carbon atoms confined within said housing means,
anode means for electrochemical oxidation of the alcohol lying within said housing means in contact with said electrolyte, and
a porous cathode catalytically passive toward the alcohol extending from the exterior of said housing means into contact with said electrolyte and in spaced relation with said anode means.
the improvement comprising
said cathode being uniformly impregnated with a wet-proofing material having the configuration of a bar,
one end of said bar being exposed to oxidant exterior of said housing means, and the other end, interior to the housing means, being inmmersed in said electrolyte.
means masking a major portion of said bar interior of said housing from contact with said electrolyte, said masking means being impervious to fuel and oxidant, the remainder of said bar forming an interface with said electrolyte.

2. A fuel cell unit according to claim 1 in which said porous cathode is a porous bar of carbon.

3. A fuel cell unit according to claim 1 in which said anode means and said porous cathode are mounted in narrowly spaced relation and said housing means forms an electrolyte plenum beneath said anode means and said porous cathode which exceeds the electrolyte storage capacity of said housing means adjacent said anode means and said porous cathode.

4. A fuel cell unit according to claim 1 including two porous cathodes, one mounted adjacent each of two opposite faces of said anode means.

5. An electrode according to claim 1 in which said bar is formed of porous carbon.

6. In a fuel cell unit according to claim 1
said anode means and said porous cathode being mounted in narrowly spaced relation, and
said housing means forming an electrolyte and alcohol plenum beneath said anode means and said porous cathode which exceeds the electrolyte and alcohol storage capacity of said housing means adjacent said anode means and said porous cathode.

7. In a fuel cell unit comprised of
a closed housing means,
an aqueous alkaline electrolyte containing dissolved alcohol having one to three carbon atoms confined within said housing means,
anode means for electrochemical oxidation of the alcohol lying within said housing means in contact with said electrolyte, and a porous non-wetproofed cathode, catalytically passive toward the alcohol, extending from the exterior of said housing means in contact with said electrolyte and in spaced relation with said anode, means for maintaining said electrolyte at a pressure slightly below ambient to fix said electrolyte interface toward the lower end of said cathode,
the improvement comprising said cathode having the configuration of a bar,
one end of said bar being exposed to the oxidant exterior of said housing means,
means masking a major portion of said bar interior of said housing,
said masking means being impervious to fuel and oxidant, the remainder of said bar forming an interface with said electrolyte.

8. In the fuel cell of claim 1, at least the portion of said cathode in contact with said electrolyte being electrocatalytically active.

References Cited

UNITED STATES PATENTS

| 273,739 | 3/1883 | Jablochkoff | 136—83 |
| 2,797,254 | 6/1957 | Schumacher et al. | 136—136 |
| 2,901,523 | 8/1959 | Justi et al. | 136—86 |
| 3,393,100 | 7/1968 | Niedrach | 136—120 |
| 3,097,116 | 7/1963 | Moos | 136—86 |

WINSTON A. DOUGLAS, Primary Examiner

H. A. FEELEY, Assistant Examiner

U.S. Cl. X.R.

136—83, 120